(12) United States Patent
Taylor et al.

(10) Patent No.: US 11,729,054 B2
(45) Date of Patent: Aug. 15, 2023

(54) RECONFIGURABLE DEVICE FOR PROCESSING SIGNALS

(71) Applicant: COMCAST CABLE COMMUNICATIONS, LLC, Philadelphia, PA (US)

(72) Inventors: Drew Taylor, Philadelphia, PA (US); Nathan A. Owens, Moorestown, NJ (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 369 days.

(21) Appl. No.: 14/331,968

(22) Filed: Jul. 15, 2014

(65) Prior Publication Data

US 2016/0020944 A1  Jan. 21, 2016

(51) Int. Cl.
*H04L 12/24* (2006.01)
*H04L 29/08* (2006.01)
(Continued)

(52) U.S. Cl.
CPC .......... *H04L 41/082* (2013.01); *H04L 69/323* (2013.01)

(58) Field of Classification Search
CPC ....... H04L 7/00–0008; H04L 7/04–041; H04L 7/08–10; H04L 27/00–0002; H04L 27/34–3411; H04L 27/345; H04L 27/36; H04L 27/38; H04L 29/00; H04L 29/02; H04L 29/06; H04L 29/06013; H04L 29/06088; H04L 29/06163; H04L 29/08–08018; H04L 29/08081; H04L 29/10; H04L 41/00; H04L 41/08–0806; H04L 41/0813–0836; H04L 41/085; H04L 41/0866; H04L 41/0876–0886; H04L 41/0896; H04L 41/16; H04L 41/20;
(Continued)

(56) References Cited

U.S. PATENT DOCUMENTS 3,842,405 A * 10/1974 Key ...................... G06F 13/385
                                                                  375/222
4,841,561 A *  6/1989 Hill ........................ H04M 11/06
                                                                  375/222
(Continued)

FOREIGN PATENT DOCUMENTS

CN          1819665 A       8/2006

OTHER PUBLICATIONS

Sotti—does any docsis modem have moca—Dec. 5, 2011.*
(Continued)

*Primary Examiner* — Boris D Grijalva Lobos
(74) *Attorney, Agent, or Firm* — Ballard Spahr LLP

(57) ABSTRACT

Methods and systems for processing signals and data are disclosed. An example method can comprise receiving a first portion of a first signal. An example method can comprise processing the first portion of the first signal based on a module. The module can comprise instructions for physical layer processing. An example method can comprise receiving an update for the module. The update can be configured to modify the instructions for physical layer processing. The module can be reconfigured based on the update. An example method can comprise processing at least one of a second portion of the first signal and a second signal based on the module reconfigured based on the update.

20 Claims, 7 Drawing Sheets

(51) Int. Cl.
*H04L 41/082* (2022.01)
*H04L 69/323* (2022.01)

(58) Field of Classification Search
CPC ... H04L 41/24–26; H04L 43/00; H04L 43/04; H04L 43/08; H04L 69/30–32; H04L 69/322–323; H04L 29/06136
See application file for complete search history.

(56) References Cited

U.S. PATENT DOCUMENTS

| | | | | |
|---|---|---|---|---|
| 4,956,852 A * | 9/1990 | Hodge | H04L 1/24 | 340/2.7 |
| 5,268,928 A * | 12/1993 | Herh | H04M 11/06 | 375/222 |
| 5,652,772 A * | 7/1997 | Isaksson | H04L 27/2665 | 375/367 |
| 6,295,545 B1 * | 9/2001 | Hsu | H03H 17/06 | 708/319 |
| 7,573,936 B2 * | 8/2009 | Hung | H04N 21/4182 | 375/222 |
| 7,796,649 B2 * | 9/2010 | Jeong | H04B 1/707 | 370/480 |
| 7,949,108 B2 * | 5/2011 | Lee | H04L 12/2801 | 379/93.01 |
| 8,010,959 B2 * | 8/2011 | Mullis, II | G06F 9/4415 | 717/173 |
| 8,159,994 B2 * | 4/2012 | Eidenschink | H04B 7/18582 | 370/316 |
| 8,347,341 B2 * | 1/2013 | Markley | H04L 12/2803 | 725/80 |
| 8,839,227 B2 * | 9/2014 | Walston | G06F 11/1433 | 717/168 |
| 8,863,201 B2 * | 10/2014 | Brooks | H04L 12/2898 | 725/78 |
| 9,146,730 B2 * | 9/2015 | Lazar | G06F 8/65 | |
| 9,268,630 B1 * | 2/2016 | Walston | G06F 11/08 | |
| 2001/0046268 A1 * | 11/2001 | Sharma | H04J 1/05 | 375/324 |
| 2003/0115101 A1 * | 6/2003 | Kim | G06Q 30/02 | 705/14.73 |
| 2003/0133519 A1 * | 7/2003 | Shah | H04L 1/0054 | 375/340 |
| 2005/0034115 A1 * | 2/2005 | Carter | G06F 8/61 | 717/173 |
| 2005/0044472 A1 * | 2/2005 | Lu | H04L 7/048 | 714/784 |
| 2006/0239176 A1 | 10/2006 | Garrison et al. | | |
| 2008/0138071 A1 * | 6/2008 | Lee | H04H 20/69 | 398/67 |
| 2009/0158383 A1 * | 6/2009 | Taskiran-Cyr | H04N 7/17318 | 725/132 |
| 2011/0002245 A1 * | 1/2011 | Wall | H04L 12/10 | 370/297 |
| 2011/0107404 A1 * | 5/2011 | Ramsdell | H04L 12/14 | 726/5 |
| 2011/0197243 A1 * | 8/2011 | Kuo | H04L 12/2801 | 725/110 |
| 2011/0286345 A1 * | 11/2011 | Goue | H04L 1/205 | 370/252 |
| 2012/0128045 A1 * | 5/2012 | Ling | H04L 12/2801 | 375/222 |
| 2012/0137332 A1 * | 5/2012 | Kumar | H04N 21/26606 | 725/62 |
| 2014/0186041 A1 * | 7/2014 | Shellhammer | H04B 10/27 | 398/79 |
| 2015/0188822 A1 * | 7/2015 | Frieh | H04B 3/02 | 370/235 |

OTHER PUBLICATIONS

NVIDIA Delivers the Highest Graphics Performance for AMD Family of Processors—nvidia.com—Jun. 7, 1999.*
Volpe, "DOCSIS 3.0 Tutorial—Downstream Channel Bonding", volpefirm.com (Year: 2010).*
Rouse, "DOCSIS (Data Over Cable Service Interface Specifications—Definition", Techtarget.com (Year: 2005).*
Stephens, "The Data Link Layer: Understanding one of my favorite layers of the OSI Model", Ethergeek (Year: 2011).*
DOCSIS 3.0—CM-SP-MULPIv3.0-I01-060804 (Year: 2006).*
DOCSIS 2.0—CM-SP-OSSIV2.0-C01-081104—2008 (Year: 2008).*
Bakuriu, "interfaces—What is meant by the phrase "Software can replace hardware"", stackexchange (Year: 2016).*

* cited by examiner

US 11,729,054 B2

RECONFIGURABLE DEVICE FOR PROCESSING SIGNALS

BACKGROUND

Network capacity and size continues to grow in order to serve the interests of network users. Occasionally, new protocols are implemented to accommodate and implement network growth. These new protocols can cause devices to become obsolete. For example, hardware elements of a device may need to be replaced to implement new protocols. Thus, there is a need for more sophisticated methods and systems for implementing updated protocols.

SUMMARY

It is to be understood that both the following general description and the following detailed description are exemplary and explanatory only and are not restrictive, as claimed. Provided are methods and systems for processing signals. In one aspect, reconfigurable modules can be implemented in a network device such as a gateway, router, access point, set top box, and/or the like. The reconfigurable modules can comprise instructions for processing signals at the physical layer or other layers. As new protocols are developed and/or existing protocols are updated, the reconfigurable modules can be updated to reconfigure a network device to allow modifications in processing at the physical layer and/or other layers. The reconfigurable modules can be updated without replacement of hardware components of the network device.

In one aspect, an example method can comprise receiving a first portion of a first signal. The first portion of the first signal can be processed based on a module. The module can comprise instructions for physical layer processing (e.g., processing signals, such as the first signal, at a physical layer of the first signal). An update for the module can be received. The update can be configured to modify the instructions for physical layer processing. The module can be reconfigured based on the update. At least one of a second portion of the first signal and a second signal can be processed based on the module reconfigured based on the update.

In another aspect, an example method can comprise receiving a first signal. The first signal can be converted to a second signal. A first portion of the second signal can be selected based on a first reconfigurable module configured with first signal processing instructions. A second portion of the second signal can be selected based a second reconfigurable module configured with second signal processing instructions. The first portion of the second signal can be processed based on the first reconfigurable module. The second portion of the second signal can be processed based on the second reconfigurable module.

In one aspect, an example system (e.g., gateway) can comprise a first digital-to-analog converter configured to provide a first signal based on a second signal. The system can comprise a processing unit configured to receive the first signal. The processing unit can be configured to process a first portion of the first signal according to a first module. The first module can comprise instructions for processing the first portion of the first signal based on a first protocol. The processing unit can be configured to process a second portion of the first signal according to a second module. The second module can comprise instructions fir processing the second portion of the first signal based on a second protocol. At least one of the first module and the second module can be reconfigurable, based on an update, in controlling signal processing at a physical layer of the first signal.

Additional advantages will be set forth in part in the description which follows or may be learned by practice. The advantages will be realized and attained by means of the elements and combinations particularly pointed out in the appended claims.

BRIEF DESCRIPTION OF THE DRAWINGS

The accompanying drawings, which are incorporated in and constitute a part of this specification, illustrate embodiments and together with the description, serve to explain the principles of the methods and systems.

DETAILED DESCRIPTION

Figure 1:
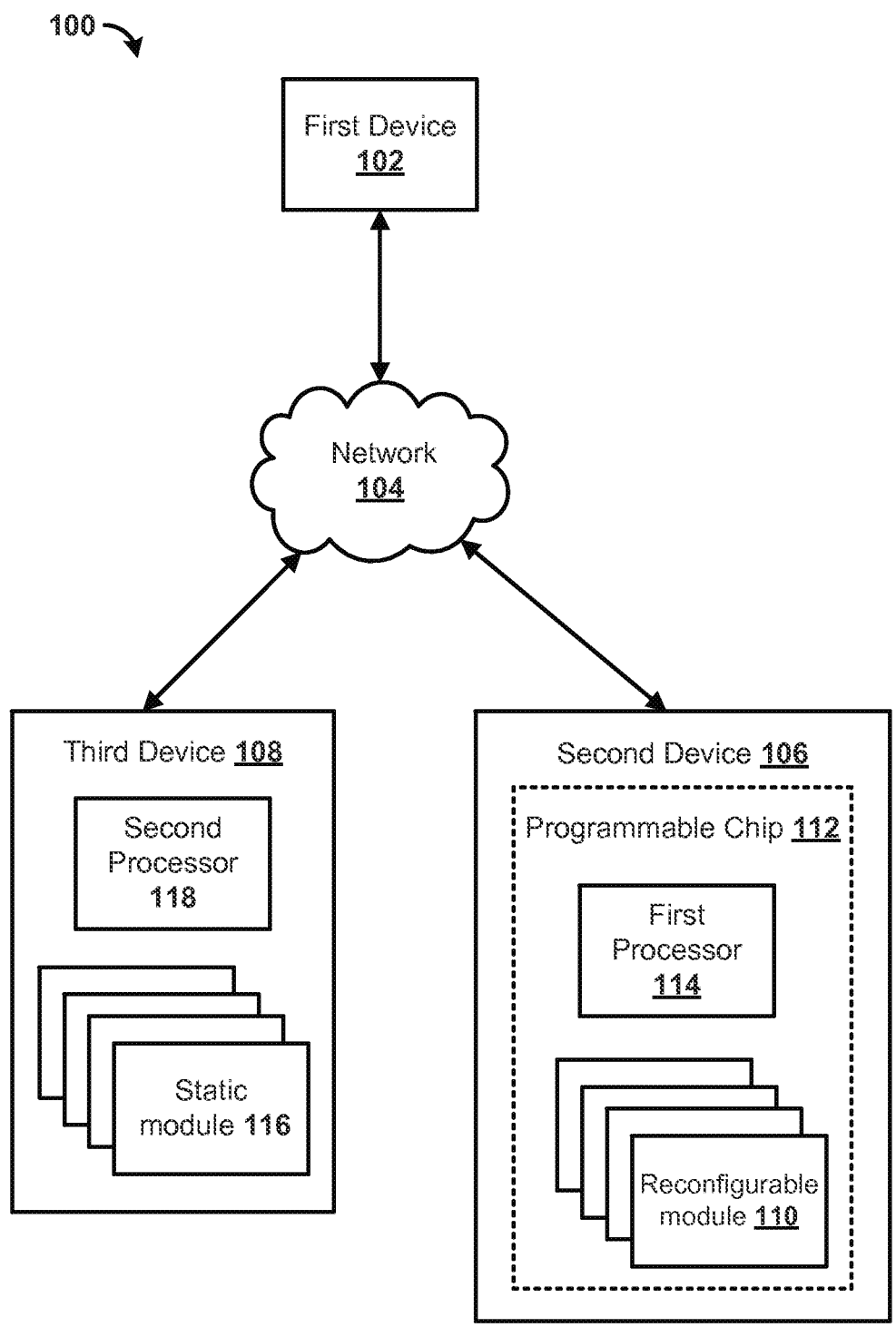
FIG. 1 is a block diagram illustrating an example system for updating devices.

Before the present methods and systems are disclosed and described, it is to be understood that the methods and systems are not limited to specific methods, specific components, or to particular implementations. It is also to be understood that the terminology used herein is for the purpose of describing particular embodiments only and is not intended to be limiting.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific embodiment or combination of embodiments of the disclosed methods.

The present methods and systems may be understood more readily by reference to the following detailed description of preferred embodiments and the examples included therein and to the Figures and their previous and following description.

As will be appreciated by one skilled in the art, the methods and systems may take the form of an entirely hardware embodiment, an entirely software embodiment, or an embodiment combining software and hardware aspects. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, or magnetic storage devices.

Embodiments of the methods and systems are described below with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, can be implemented by computer program instructions. These computer program instructions may be loaded onto a general purpose computer, special purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

The present disclosure relates to a reconfigurable gateway device. For example, the device can comprise one or more modules configured to provide a processor with procedures for processing one or more signals. Each module can be configured based on (e.g., in accordance with) one or more protocols, such as Data Over Cable Service Interface Specification (DOCSIS) based protocol, multimedia over coax alliance (MoCA) based protocol, any protocol associated with a cable distribution and/or access network, IEEE 802.11 (e.g., Wi-Fi) protocol, Bluetooth protocol, IEEE 802.15.4 protocol (e.g., Zigbee protocol), and/or other similar protocols. The protocol can comprise a physical layer protocol configured to specify the parameters and procedures for generating and/or processing signals on a physical medium, such as a physical wire (e.g., copper, fiber optic) or wireless transmission medium. The device can be updated and/or reconfigured to process signals on the physical medium differently, for example, without replacing hardware components of the device. For example, the modules can be updated based on an update received by the device through a signal or other file transfer. As an illustration, the modules can allow lower level protocols (e.g., physical layer, data link layer) to access an entire signal such that the frequency range for a particular protocol can be modified. Additionally, the device allows for other modifications and additions of lower level protocols.

FIG. 1 is a block diagram illustrating an example system 100 for updating devices. Those skilled in the art will appreciate that present methods may be used in systems that employ both digital and analog equipment. One skilled in the art will appreciate that provided herein is a functional description and that the respective functions can be performed by software, hardware, or a combination of software and hardware. In an exemplary embodiment, the methods and systems disclosed can be located within the first device 102 and/or second device 106. For example, the second device 106 can comprise a communication unit (e.g., on a programmable chip) configured to process content (e.g., video, audio, images, text) and/or other data based on one or more reconfigurable modules according to the present methods and systems. Additionally, the communication unit can be updated and/or reconfigured according to the present methods and systems. In another aspect, the first device 102 can be configured to identify reconfigured devices and provide updates (e.g., to lower level functionality) to the reconfigurable devices.

In one aspect, the system 100 can comprise first device 102. The first device 102 can be communicatively coupled to one or more devices through a network 104. For example, the system 100 can comprise a second device 106, a third device 108, and/or the like. In one aspect, the first device 102 can be managed by a service provider, such as a content provider, network access provider, and/or the like.

The second device 106 and/or third device 108 can be user devices (e.g., customers of the service provider), devices in a distribution network, devices in an access network, and/or the like. For example, the second device 106 and/or third device 108 can be gateways configured to provide user access to the network 104. As a further example, the second device 106 can be a gateway configured to provide access to the network 104 for a first user. The third device 108 can be a gateway configured to provide access to the network 104 for a second user. As a further example, the second device 106 and/or third device 108 can comprise a router, gateway, switch, digital streaming device, set top box, computing device, and/or the like.

In one aspect, the first device 102 can be configured to provide an update to one or more devices through the network 104. The first device 102 can be configured to identify one or more devices that are reconfigurable through updates, such as software updates. As an example, a software update can comprise an update to firmware or other software module comprising computer readable code, such as computer readable instructions.

As an illustration, the second device 106 can comprise one or more reconfigurable modules 110 (e.g., software modules) that can be reconfigured by modifying, adding, deleting, and/or the like, computer readable code in the reconfigurable module. The reconfigurable modules 110 can specify one or more of, physical layer protocols, operations, instructions, and/or the like for processing signals at the physical layer of the network 104. As an illustration, the second device 106 can comprise a programmable chip 112, such as a field programmable gate array (FPGA). The programmable chip 112 can comprise a plurality of reconfigurable elements, such as logic gates. The programmable chip 112 can comprise the reconfigurable modules 110, a first processor 114, memory, and/or other elements. As a further illustration, the second device 106 can comprise a first reconfigurable module for processing signals based on quadrature amplitude modulation (QAM), a second reconfigurable module for processing signals based on a DOCSIS protocol, a third reconfigurable module for processing signals based on a MoCA protocol, a fourth reconfigurable module based one or more additional protocols, and/or the like. The reconfigurable modules 110 can provide (e.g., store, allow access, transmit) instructions to the first processor 114 for processing data signals at the physical layer and/or other layers. For example, QAM can comprise a protocol for implementing a modulation scheme over a radio frequency physical layer. The reconfigurable modules can process signals, packets, frames, bit streams, data, and/or the like based on other protocols (e.g., of a higher layer in the OSI model) such as voice over internet protocol (VOIP), Internet Protocol (IP), transmission control protocol (TCP), internet control message protocol (ICMP), and/or the like.

The third device 108 can comprise one or more static modules 116 for processing signals at the physical layer of the network. For example, a static module 116 can comprise one or more application specific integrated circuit (ASIC) 116. The static modules 116 can be unable to be reconfigured to process at the physical layer based on a software update. For example, a static module 116 can comprise circuit elements configured as a band pass filter. The static module 116 can filter and/or select a certain portion of a signal based on one or more circuit elements (e.g., that are not reconfigurable based on a software update). In one aspect, one or more (or each) of the static modules 116 can comprise a digital-to-analog convertor and/or analog-to-digital converter. As a further example, the third device 108 can comprise a first static module for processing signals based on QAM, a second static module for processing signals based on a DOCSIS protocol, a third static module for processing signals based on a MoCA protocol, and/or the like. The third device 108 can comprise a second processor 118 configured to receive data from the one or more static modules 116. The second processor 118 may have no knowledge of signal processing at the physical layer. For example, the second processor 118 can be configured to interface data received by a static module 116 with other system elements such as a WiFi, VOIP, MoCA and/or other interfaces.

In one aspect, the first device 102 can be configured to select a device for an update. The first device 102 can select and/or generate an update customized to the device. For example, the first device 102 can be configured to determine whether the selected device comprises one or more reconfigure modules that are reconfigurable based on an update (e.g., software update). If the selected device comprises a reconfigurable module that is reconfigurable based on an update, then the first device 102 can provide the update to the selected device. For example, if the selected device is the second device 106, then the first device 102 can provide an update to reconfigure at least one of the first reconfigurable module, second reconfigurable module, third reconfigurable module, fourth reconfigurable module, first processor 114, and/or the like of the second device 106. The update can reconfigure, modify, add, delete, and/or the like instructions for processing signals at a physical layer of the signal. The selected device is the third device 108, the first device 102 may be unable to provide an update to modify the physical layer operations, procedures, instructions and/or the like of the third device 108. For example, the update may be unable to modify the physical layer operations of the third device 108 because the physical layer operations are implemented by the one or more static circuit components of the third device 108. An update to the physical layer operations of the third device 108 may require physical replacement of one or more static modules 116 of the third device 108. An update to the third device can modify higher layer operations, such as operations at the network layer, application layer, and/or the like.

Figure 2:
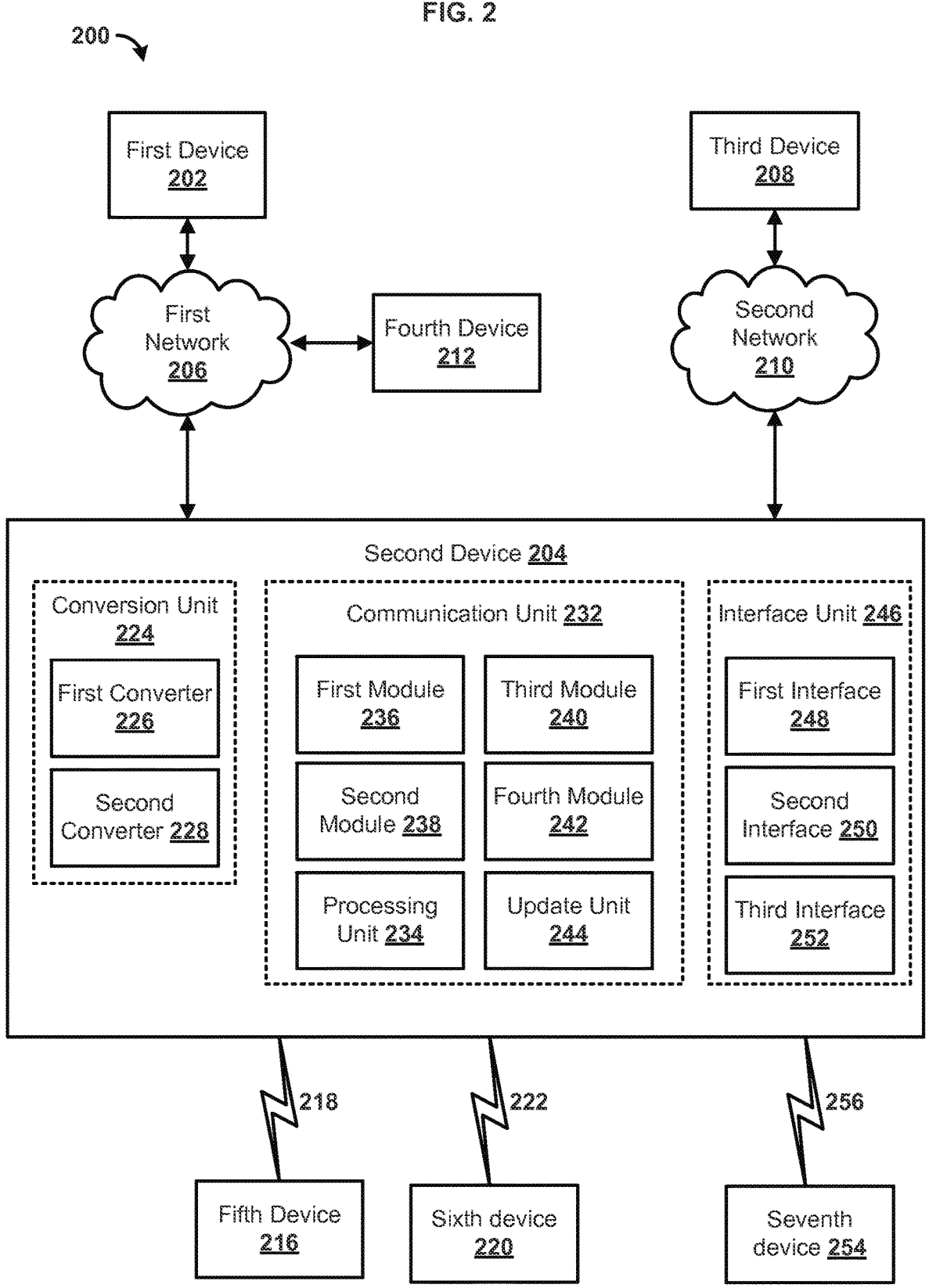
FIG. 2 is a block diagram illustrating an example system for processing data.

FIG. 2 is a block diagram illustrating an example system 200 for processing data. In an exemplary embodiment, the methods and systems disclosed can be located within the second device 204. For example, the second device can comprise a communication unit 232 configured to process content (e.g., video, audio, images, text) and/or other data based on one or more reconfigurable modules according to the present methods and systems. Additionally, the communication unit 232 can be updated and/or reconfigured according to the present methods and systems.

In one aspect, the system 200 can comprise a first device 202 communicatively coupled to second device 204 through a first network 206. The second device 204 can be communicatively coupled to a variety of devices through a variety of networks. For example, the second device 204 can be communicatively coupled to a third device 208 through a second network 210. The second device 204 can be communicatively coupled to a fourth device 212 through the first network 206. The second device 204 can also be communicatively coupled to a variety of devices through one or more communication links. For example, the second device 204 can be coupled to a fifth device 216 though a first link 218. The second device 204 can be coupled to a sixth device 220 through a second link 222. The second device 204 can be coupled to a seventh device 254 through a third link 256.

In one aspect, the first network 206 and/or second network 210 can comprise a packet switched network (e.g., interact protocol based network), a non-packet switched network (e.g., quadrature amplitude modulation based network), and/or the like. The first network 206 and/or second network 210 can comprise network adapters, switches, routers, modems, and the like connected through wireless links (e.g., radio frequency, satellite) and/or physical links (e.g., fiber optic cable, coaxial cable, Ethernet cable, or a combination thereof). In one aspect, the first network 206 and/or second network 210 can be configured to provide communication from telephone, cellular, modem, and/or other electronic devices to and throughout the system 200.

In one aspect, the first link 218 and/or second link 222 can comprise a physical link to one or more peripheral devices. For example, the fifth device 216 can comprise a telephone headset, telephone handset, and/or other communication speaker. As another example the sixth device 220 can comprise a television, display, screen, and/or other device configured to present, display, and/or otherwise play media.

In one aspect, the second device 204 can be configured as a gateway, router, switch, wireless access point, set top box, and/or other device. The second device 204 can be configured to provide content and other data according to a variety of protocols. In one aspect, the second device 204 can comprise a conversion unit 224 configured to convert between analog and digitals signals. For example, the conversion unit 224 can comprise a first converter 226 configured to convert a first analog signal to a first digital signal. Additionally, the first converter 226 can be configured to convert a first digital signal to a first analog signal. The first analog signal can comprise a signal carried on the first network 206. For example, the first network 206 can comprise a first radio frequency transmission medium. As an illustration, the first radio frequency transmission medium can comprise a physical wire, such as a fiber optic cable, coaxial cable, and/or the like. As an example, the first network 206 can be configured as a cable distribution and/or access network. The first network 206 can also be configured as a DOCSIS based network. The first network 206 can further be configured as a MoCA network.

In one aspect, the conversion unit 224 can comprise a second converter 228 configured to convert a second analog signal to a second digital signal. Additionally, the second converter 228 can be configured to convert a second digital signal to a second analog signal. The second analog signal can comprise a signal carried on the second network 210. For example, the second network 210 can comprise a second radio frequency transmission medium. As an illustration, the second radio frequency transmission medium can comprise a wireless transmission medium, such as a transmission medium used by a Wi-Fi (e.g., local wireless network, IEEE 802.11), cellular network (e.g., LTE, 4G, 3G, WiMax), Bluetooth, IEEE 802.15.4 (e.g., Zigbee), and/or the like.

In one aspect, the second device 204 can comprise a communication unit 232 configured to process signals received by the second device 204. For example, the communication unit 232 can receive the first digital signal, second digital signal, and/or the like from the first converter 226 and second converter 228 respectively. In one aspect, the communication unit 232 can comprise a processing unit 234 configured to process the signals received by the second device 204. For example, the processing unit 234 can comprise one or more computer processors. In one aspect, the communication unit 232 can be implemented by one or more programmable circuit elements, such as logic gates, memory elements (e.g., flip flops), and/or the like. For example, the communication unit 232 can be implemented on a system on a chip, FPGA, and/or the like.

In one aspect, the communication unit 232 can comprise one or more modules (e.g. the reconfigurable modules 110 of FIG. 1) configured to provide instructions, procedures, and/or the like to the processing unit 234 for processing the signals received by the second device 204. For example, the communication unit 232 can comprise a first module 236 configured to provide (e.g., store, allow access to, transmit, implement) first instructions for processing based on a first protocol. As an example, the first protocol can comprise a DOCSIS protocol. As an illustration, the first instructions can be configured to specify procedures for providing data and other network connectivity between the second device 204 and the first device 202. The first instructions can be configured to instruct the processing unit 234 on procedures for processing the first digital signal. The first instructions can be configured to instruct the processing unit 234 to select portions (e.g., within a specified frequency range) of the first signal relevant to the first protocol. The first instructions can be configured instruct the processing unit 234 on procedures for interpreting the selected portions of the first digital signal. The first instructions can be configured to instruct the processing unit 234 on procedures for generating an additional signal (e.g., in response to the first digital signal). For example, the processing unit 234 can be configured to provide the additional signal as a digital signal to the first converter 226 based on the first instructions. The first converter 226 can convert the additional signal to an analog signal for transmission across the first network 206 to the first device 202. The first instructions can be configured to instruct the processing unit 234 to demodulate the digital signal to form a bit-stream. The first instructions can be configured to instruct the processing unit 234 to decode the bit stream into data packets or frames, such as internet (IP) protocol packets, Ethernet packets, IEEE 802.15.4 packets, Ethernet frames, and/or the like.

The communication unit 232 can comprise a second module 238 configured to provide second instructions for processing based on a second protocol. For example, the second protocol can comprise a MoCA based protocol. As an illustration, the second instructions can be configured to specify procedures for providing data and other network connectivity between the second device 204 and the fourth device 212. For example, the fourth device 212 can comprise a local device, such as a device located within or proximate to a user premises. As an example, the fourth device 212 can be connected to the second device 204 through one or more coaxial cables wired within or proximate to the user premises. The second instructions can be configured to instruct the processing unit 234 on procedures for processing the first digital signal. The second instructions can be configured to instruct the processing unit 234 to select portions (e.g., within a specified frequency range) of the first digital signal relevant to the second protocol. The second instructions can be configured to instruct the processing unit 234 on procedures for interpreting the selected portions of the first digital signal. The second instructions can be configured to instruct the processing unit 234 on procedures for generating an additional signal (e.g., in response to the first digital signal). For example, the processing unit 234 can be configured to provide the additional signal as a digital signal to the first converter 226 based on the second instructions. The first converter 226 can convert the additional signal to an analog signal for transmission across the first network 206 to the fourth device 212.

The communication unit 232 can comprise a third module 240 configured to provide (e.g., store, allow access, transmit, implement) third instructions for processing based on a third protocol. The third protocol can comprise a Wi-Fi (e.g., IEEE 802.11) protocol configured to communicate over a wireless network, such as the second network 210. As an illustration, the third instructions can be configured to specify procedures for providing data and other network connectivity between the second device 204 and the third device 208. The third instructions can be configured to instruct the processing unit 234 on procedures for processing the second digital signal. The third instructions can be configured to instruct the processing unit 234 to select portions (e.g., within a specified frequency range) of the second digital signal relevant to the third protocol. The third instructions can be configured to instruct the processing unit 234 on procedures for interpreting the selected portions of the second digital signal. The third instructions can be configured to instruct the processing unit 234 on procedures for generating an additional signal (e.g., in response to the second digital signal). For example, the processing unit 234 can be configured to provide the additional signal as a digital signal to the second converter 228 based on the third instructions. The first converter 226 can convert the additional signal to an analog signal for transmission across the second network 210 to the third device 208.

The communication unit 232 can comprise a fourth module 242 configured to provide (e.g., store, allow access, transmit, implement) fourth instructions for processing based on a fourth protocol. The fourth protocol can comprise a protocol for processing media signals received from a cable distribution network and/or cable access network. For example, the cable distribution network and/or cable access network can provide media (e.g., video, audio, images, data, and/or the like) based on one or more modulation techniques such as quadrature amplitude modulation, quadrature phase shift keying, and/or the like. As an illustration, the fourth instructions can be configured to specify procedures for communication of media and related data between the second device 204 and the first device 202. The fourth instructions can be configured to instruct the processing unit 234 on procedures for processing the first digital signal. The fourth instructions can be configured to instruct the processing unit 234 to select portions e.g., within a specified frequency range) of the first digital signal relevant to the fourth protocol. The fourth instructions can be configured to instruct the processing unit 234 on procedures for interpreting the selected portions of the first digital signal. The fourth instructions can be configured instruct the processing unit 234 on procedures for generating an additional signal (e.g., upstream communications from a set top box). For example, the processing unit 234 can be configured to provide a digital signal to the first converter 226 based on the fourth instructions. The first converter 226 can convert the digital signal to an analog signal for transmission across the first network 206 to the first device 202.

In one aspect, at least one of the first protocol, second protocol, third protocol, and fourth protocol can be physical layer protocols, data link layer protocols, lower level protocols (e.g., below the physical layer), and/or the like. For example, a physical layer protocol can comprise a protocol configured to specify the processing of a signal at the physical layer. A physical layer protocol can specify how a device (e.g., second device 204) accesses, manipulates, analyzes, and otherwise processes physical aspects of a signal. As an illustration, a physical layer protocol can specify radio frequency bonding procedures (e.g., channel bonding). A physical layer protocol can define a radio frequency spectrum range for processing a signal. A physical layer protocol can define electrical and physical specifications of a data connection. A physical layer protocol can specify the relationship between a device and a physical transmission medium, such as the layout of pins, voltages, line impedance, cable specifications, signal timing, hubs, repeaters, network adapters, host bus adapters (HBA used in storage area networks) and/or the like. A physical layer protocol can define procedures for establishing and terminating a connection between two directly connected devices over a communications medium. A physical layer protocol can specify flow control. A physical layer protocol can specify the modulation or conversion between the representation of digital data and the corresponding signals transmitted over the physical communications channel (e.g., physical cabling, or a wireless radio link). A physical layer protocol can specify a procedure, such as a modulation procedure and provide a bit stream to the data link layer. For example, a physical layer protocol can specify a modulation procedure for forming a bit stream. In one aspect, some protocols can comprise instructions for physical layer operations, data link layer operations, and/or the like. The term physical layer protocol can comprise aspects (e.g., instructions) of a protocol between the physical layer and data link layer and/or operations closely related to the physical layer, such as transporting information from the physical layer to another layer (e.g., data link layer), formation of packets or frames from a bit stream and/or the formation of a bit stream from packets or frames, and/or the like.

In one aspect, the communication unit 232 can comprise an update unit 244 configured to update the one or more modules of the communication unit 232. For example, the update unit 244 can be configured to update the first module 236, second module 238, third module 240, fourth module 242, and/or the like. In one aspect, the update unit 244 can receive an update for one or more of the modules. The update can be received in a signal from the first network 206, second network 210, and/or other connection. For example, the second device 204 can be configured to receive the update through a trivial file transfer protocol, file transfer protocol, and/or the like. In one aspect, the update can comprise a firmware update or other similar update. The update unit 244 can replace and/or modify some or all of the instructions stored in a module based on the update.

In one aspect, the update unit 244 can be configured to modify instructions that specify procedures for processing a signal at the physical layer. For example, the update unit 244 can reprogram one or more programmable circuit elements of the communication unit 232. For example, the update unit 244 can reprogram (e.g. update, modify, and/or otherwise alter) programmable circuit elements associated with a module that is being updated. In one aspect, the update can reprogram the programmable circuit elements, such that the program circuit elements comprise updated instructions (e.g., updated protocol). For example, the update can replace, delete, and/or update instructions implementing a protocol (e.g., physical layer protocol) to a newer version of the protocol. The update can add instructions for implementing an additional protocol. As an illustration, the update unit 244 can be configured to update the first module 236. The update unit 244 can update and/or replace a first DOCSIS protocol with a second DOCSIS protocol (e.g., update from version 2.0 to version 3.0, update from version 3.0 to 3.1, and/or the like). For example, the update unit 244 can be configured to update physical layer aspects and/or data link layer aspects of DOCSIS. The update unit 244 can be configured to update instructions by redefining channel width, modifying a modulation scheme, altering a channel bonding scheme, changing a frequency range allocated for specified signaling, and/or the like. As a further illustration, the update can reconfigure a procedure for channelizing demodulated spectrum. The update can reconfigure a procedure for demodulating a QAM stream based on the channelized demodulated spectrum. The update can reconfigure aspects (e.g., instructions) of a protocol that control operations between the physical layer and data link layer and/or operations closely related to the physical layer, such as transporting information from the physical layer to another layer (e.g., data link layer), formation of packets or frames from a bit stream and/or the formation of a bit stream from packets or frames, and/or the like.

The update unit 244 can also be configured to update the second module, 238, third module 240, fourth module 242, processing unit 234, and/or the like. For example, the update unit 244 can be configured to reprogram programmable circuit elements associated with the first module 236, second module 238, third module 240, fourth module 242, processing unit 234, and/or the like. As an illustration, the update unit 244 can be configured to update instructions implementing protocols (e.g., physical layer protocols), such as MoCA, QAM, DOCSIS, and/or other protocols implemented by the communication unit 232. As a further illustration, the update unit 244 can be configured to add functionality for additional modules and/or protocols not previously implemented by the communication unit 232. The update unit 244 can be configured to add, delete, and/or modify instructions associated with physical layer, data link layer operations, and/or operations below the physical layer of the communication unit and/or modules thereof. As a further illustration, the update can reconfigure a procedure for channelizing demodulated spectrum. The update can reconfigure a procedure for demodulating a QAM stream, orthogonal frequency division multiplexing (OFDM) stream, and/or the like based on the channelized demodulated spectrum.

In one aspect, the second device 204 can comprise an interface unit 246 configured to provide an interface to one or more devices, such as the seventh device 254. For example, the interface unit 246 can comprise a first interface 248 configured to provide a network interface for network communications across a third link 256. For example, the first interface 248 can comprise an Ethernet interface. As an illustration, the first interface 248 can receive data from the communication unit 232. The first interface 248 can provide the received data across the third link 256 to the seventh device 254.

In one aspect, the interface unit 246 can comprise a second interface 250 configured to provide an interface with a device, such as the fifth device 216. For example, the second interface 250 can be configured to provide an interface with a television, sound system, display, and/or the like. The second interface 250 can comprise a media interface configured to receive media (e.g., video, audio, data) from the communication unit 232. The second interface 250 can be configured to provide the received media across the first link 218 to the fifth device 216.

In one aspect, the interface unit 246 can comprise a third interface 252 configured to provide an interface with a device, such as the sixth device 220. In one aspect, the sixth device 220 can comprise a telephone (e.g., handset, headset, earpiece, and/or the like). The, the third interface 252 can be configured to provide an interface with the telephone (e.g., handset, headset, ear piece). The third interface 252 can receive and provide audio signals and/or other media signals (e.g., data, video) across the second link 222 to and/or from the sixth device 220. As a further example, the third interface 252 can comprise a voice over internet protocol (VoIP) interface configured to enable telephone and/or other similar communications.

Figure 3:
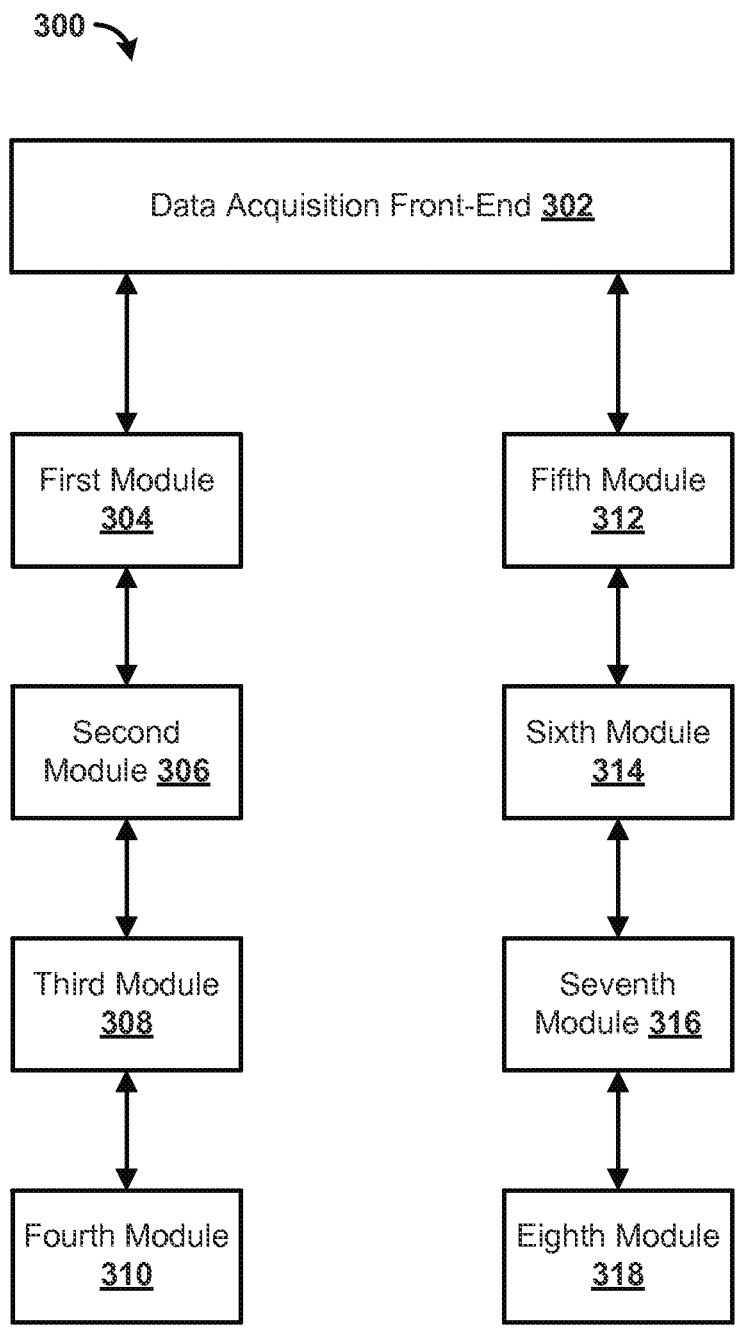
FIG. 3 is a block diagram illustrating an example system for processing a signal.

FIG. 3 is a block diagram illustrating an example system 300 for processing a signal. In one aspect, the system 300 can comprise a data acquisition front-end 302. The data acquisition front-end can be configured to convert analog signals on a physical layer interface into a digital representation for processing by one or more modules.

In one aspect, an example system 300 can comprise a plurality of modules coupled to, accessible to, or otherwise in communication with a computer processor (e.g., processing unit of FIG. 2). For example, the plurality of modules can comprise the first module 236, second module 238, third module 240, and/or fourth module 242 of FIG. 2. As a further example, the first module 236, second module 238, third module 240, and/or fourth module 242 of FIG. 2 can comprise one or more of the plurality of modules. The plurality modules can be software modules. In one aspect, the plurality of modules can implement a hierarchy of protocols and modulation schemes. FIG. 3 illustrates a basic flow of signals, data, and other output between the plurality of modules. For example, FIG. 3 can illustrate the flow of information between different software modules implemented by a single or more multiple processors. For example, one or more of the modules can be different subroutines, threads, and/or the like implemented by one or more processors. In another aspect, one or more (or each) module can have a corresponding processor contained with and/or dedicated to the corresponding module. The flow can begin by a radio frequency (RF) layer outside of the software layer passing spectrum into a processing unit. This spectrum will first be acted on by a processor running a software module responsible for the detection and demodulation of the relevant signal information in the spectrum acquired by the RF layer.

In one aspect, the system 300 can comprise a first module 304. This first module 304 can be configured to implement digital signal processing (DSP) algorithms to isolate the desired spectrum from the acquired data. Isolation of the desired spectrum can be accomplished by running a Fourier-Transform on the acquired data and applying a Finite Impulse Response filter to filter out the unwanted spectrum. The first module 304 can output a filtered spectrum containing only the frequencies of interest to the first module 304. For example, the first module 304 can be configured to filter the spectrum based on a protocol, such as DOCSIS, MoCA, WiFi, and/or the like.

In one aspect, the system 300 can comprise a second module 306. The second module 306 can be configured for the modulation, demodulation, and/or the like of radio frequency (RF) signals within the spectrum isolated by the first module 304. The second module 306 can implement a modulation scheme, such as QAM, OFDM, and/or the like. The second module 306 can output a digital bit-stream.

In one aspect, the system 300 can comprise a third module 308 configured to receive the digital bit-stream from the second module 306. The third module 308 can be configured to implement a protocol upon the digital bit-stream received by the second module 306 to decode relevant data. For example, the third module 308 can be configured to implement a protocol, such as a DOCSIS, MoCA, IEEE 802.11 (e.g., WiFi) IEEE 802.15.4 (e.g., Zigbee), and/or other similar protocol. For example, a module configured to implement a DOCSIS protocol can comprise instructions for forming IP packets from the digital bit-stream, handling multiple-access scheduling, and/or performing other functions specific to DOCSIS. The output of the third module 308 can comprise, for example, internet protocol (IP) packets.

In one aspect, the system 300 can comprise a fourth module 310 configured to receive the output of the third module 308. The fourth module 310 can be configured to implement higher-level protocols such as IP, VoIP, IP-TV, and/or the like. The output of the fourth module 310 can comprise be a physical interface such as Ethernet, HDMI, digital audio telephone, and/or POTS telephone (e.g., from VoIP).

In one aspect, the system 300 can comprise additional modules, such as a fifth module 312, sixth module 314, seventh module 316, eighth module 318, and/or the like. For example, a first set of modules (e.g., first module 304, second module 306, third module 308, fourth module 310) can implement a first protocol. A second set of modules (e.g., fifth module 312, sixth module 314, seventh module, 316, and eighth module 318) can implement a second protocol. For example, the first set of modules can implement a DOCSIS protocol. The second set of modules can implement a MoCA protocol, QAM protocol, and/or the like. As a further example, the first module 236, second module 238, third module 240, and/or fourth module 242 of FIG. 2 can comprise the first set of modules and/or second set of modules.

In one aspect, the first module 304, second module 306, third module 308, and/or fourth module 310 can be configured to convert analog signals into a digital representation for conveyance to the communication unit 232, the interface unit 246, and/or other element of the second device 204 of FIG. 2. In one aspect, the fifth module 312, sixth module 314, seventh module 316, and/or eighth module 318 can be configured to convert digital signals from the communication unit 232 and interface unit 246, and/or other element of the second device 204 of FIG. 2 into analog signals for conveyance to the physical layer interface.

Figure 4:
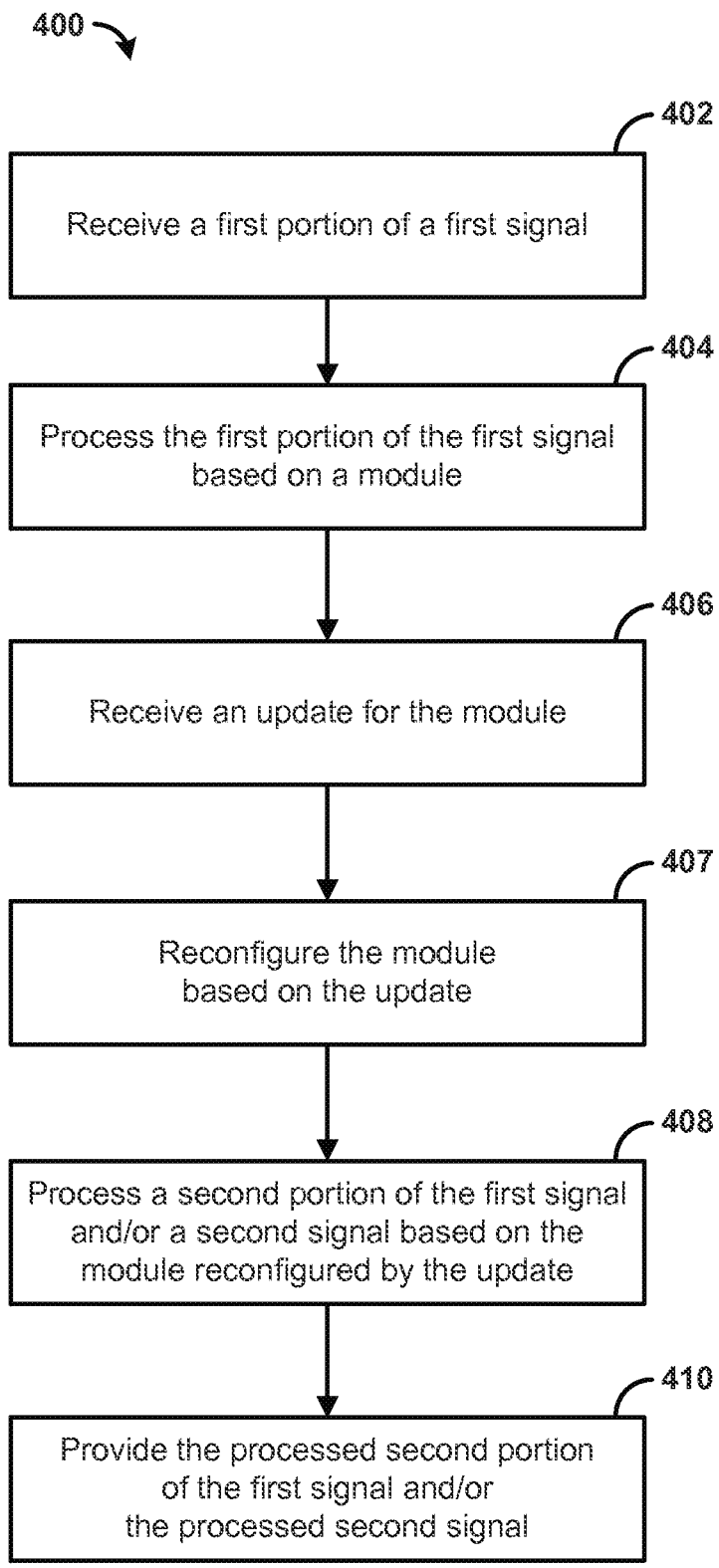
FIG. 4 is a flowchart illustrating an example method for updating a device.

FIG. 4 is a flowchart illustrating an example method 400 for updating a device. At step 402, a first portion of a first signal can be received. For example, the first signal can be a radio frequency (e.g., 3 kHz to 300 GHz) signal, a digital signal based on a radio signal, and/or the like. For example, the first signal can be received from an analog-to-digital converter. As another example, the first signal can comprise a bit stream or other signal received from a module.

At step 404, the first portion of the first signal can be processed based on a module. For example, the first portion (e.g., portion of the first signal within a first predefined frequency range and/or portion of the first signal within a first time range) of the first signal can be selected (e.g., based on signal processing). The module can comprise instructions for physical layer processing (e.g., processing signals, such as the first at a physical layer of the first signal). For example, the module can comprise instructions for processing signals based on a protocol, such as a physical layer protocol, data link layer protocol, and/or the like. The instructions can indicate channel bonding procedures, radio frequency ranges to select a signal, demodulation procedures, and/or the like. The protocol can comprise at least one of a QAM protocol (e.g., implementing a QAM based content stream), DOCSIS protocol, MoCA protocol, and/or the like. As a further example, the first portion of the first signal can be demodulated based on the module to form a first bit stream (e.g., based on the instructions from the module). As a further example, the first portion of the first signal can be modulated based on the module to form an analog signal (e.g., based on the instructions from the module). The first bit stream can be processed (e.g., decoded) according to the module. For example, the first bit stream can be packetized and/or depacketized based on the module. Multiple access scheduling can be implemented based on the first bit stream and the module.

At step 406, an update for the module can be received. In one aspect, the update can be configured to modify the instructions for physical layer processing. The update can be received via the first signal or other signal. For example, the update can be received based on a trivial file transfer protocol, file transfer protocol, and/or the like. The update can be configured to modify a spectrum range upon which a device (e.g., device comprising the module) operates based on the module. The update can be configured to modify a radio frequency bonding procedure of the module. The update can be configured to add, delete, and/or modify a protocol used by the module for physical layer processing (e.g., of at least the first portion of the first signal). In one aspect, the protocol can comprise at least one of a DOCSIS protocol, a MoCA protocol, and a protocol for processing QAM based content streams. The update can be configured to modify at least one of a procedure for generating packets (e.g., or frames) based on a bit stream and a procedure for generating a bit stream based on the packets (e.g., or frames). The update can be configured to modify at least one of a procedure for modulating and/or demodulating signals.

At step 407, the module can be reconfigured based on the update. For example, the update can be applied to all or a portion of the module. Applying the update can comprise adding, modifying, replacing, deleting, and/or the like one or more instructions, procedures, and/or the like of the module with one or more instructions, procedures, and/or the like from the update.

At step 408, at least one of a second portion of the first signal and a second signal can be processed based on the module reconfigured based on the update. For example, the second signal can be received based on the module reconfigured by the update. As an illustration, the second portion (e.g., portion of the signal within a second predefined frequency range and/or portion of the first signal within a second time range) of the first signal and/or second signal can be selected. The first signal and/or second signal can be processed based on signal processing defined by the module reconfigured by the update. The first signal and/or second signal can be processed based on a radio frequency bonding procedure modified and/or added to the module by the update. For example, the first signal and/or second signal can be demodulated based on the module reconfigured by the update. The first signal and/or second signal can be demodulated to form a second bit stream (e.g., based on the instructions from the module reconfigured by the update). The second bit stream can be processed (e.g., decoded) according to the module reconfigured by the update. For example, the second bit stream can be packetized based on the module reconfigured by the update. Multiple access scheduling can be implemented based on the first bit stream and the module reconfigured by the update.

In one aspect, processing at least one of the second portion of the first signal and the second signal based on the module reconfigured by the update can comprise forming one or more packets (e.g., or frames), converting one or more packets (e.g., or frames) to a bit stream, modulating the bit stream to form an analog signal, and/or providing the analog signal across a physical interface.

At step 410, at least one of the processed second portion of the first signal (e.g., first signal processed in step 408) and the processed second signal (e.g., second signal processed in step 408) can be provided. For example, the processed second portion of the first signal and/or processed second signal can be provided to another module. As another example, the processed second portion of the first signal and/or processed second signal can be provided across a physical layer (e.g., based on radio frequency modulation) to a remote device.

As an illustration, the method 400 can be implemented by a device (e.g., gateway, router). The first signal can comprise a digital signal received from a digital to analog receiver. The device can process the first portion of the signal based on a first version of DOCSIS (e.g., DOCSIS version 3.0). For example, the module can comprise first instructions, such as computer readable code, for implementing the first version of DOCSIS. The update can comprise second instructions, such as computer readable code, configured to instruct the device to process signals according to a second version of DOCSIS (e.g., DOCSIS version 3.1 or subsequent versions). The device can be configured to replace the first instructions with the second instructions or otherwise modify and/or delete portions of the first instructions based on the second instructions. Accordingly, the device can be reconfigured to modify (e.g., from a remote device) the way the device performs physical layer processing. Similarly, the method 400 can be used to implement modifications to other physical layer protocols, such as MoCA and QAM based content delivery protocols.

Figure 5:
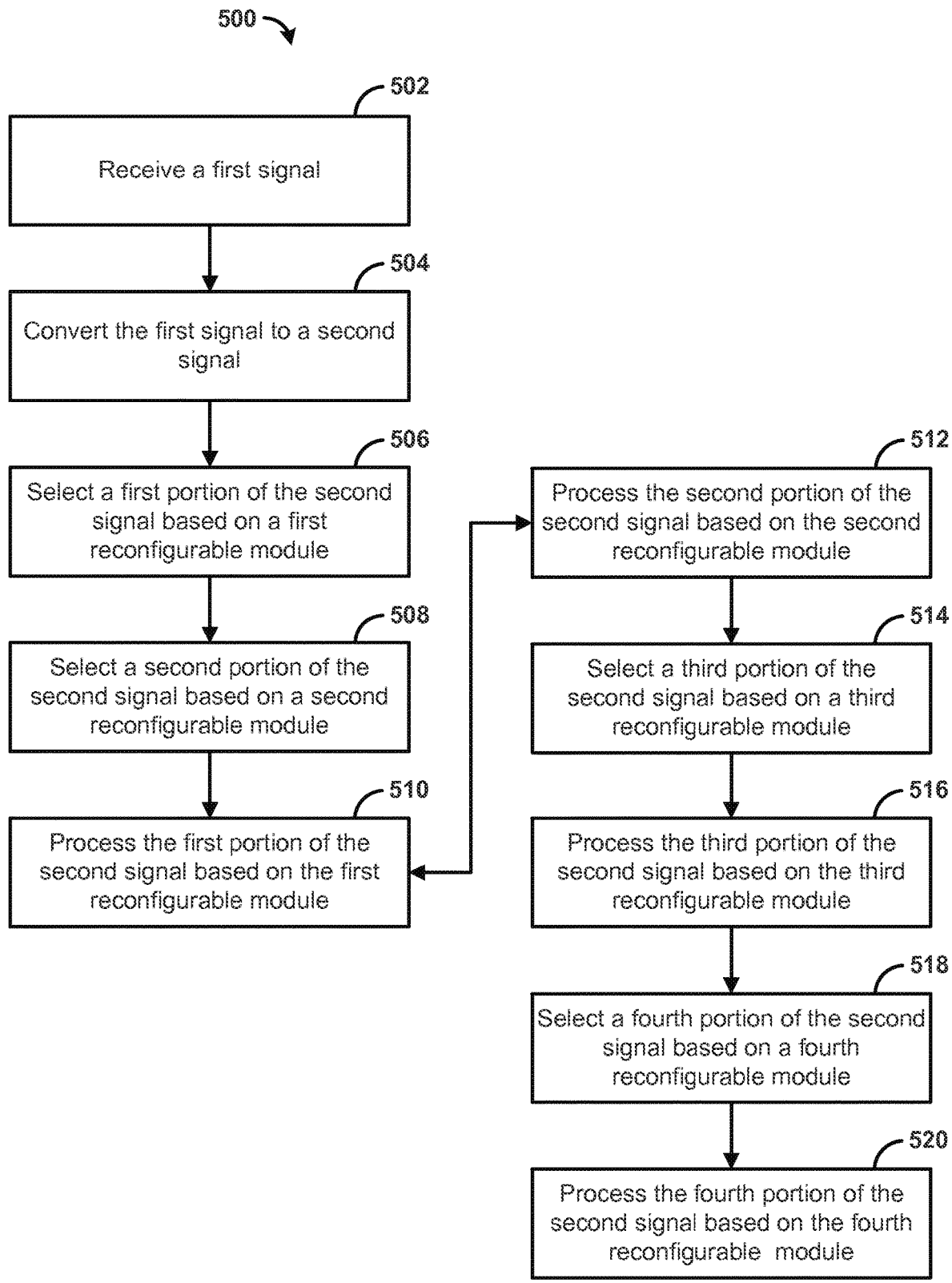
FIG. 5 is a flowchart illustrating an example method for processing a signal.

FIG. 5 is a flowchart illustrating an example method 500 for processing a signal. At step 502, a first signal can be received. For example, the first signal can be received by an antenna of a device. The first signal can be received on one or more radio frequencies. For example, the first signal can be received on a coaxial cable, fiber optic cable, wireless transmission medium, and/or the like.

At step 504, the first signal can be converted to a second signal. For example, the first signal can be converted to the second signal by an analog-to-digital converter. As a further example, the first signal can comprise an analog signal. The second signal can comprise a digital signal. As a further example, the first signal can be sampled at discrete time intervals to generate the second signal.

At step 506, a first portion of the second signal can be selected based on a first reconfigurable module. The first reconfigurable module can be configured with and/or comprise first signal processing instructions. For example, at least one of a first Fourier Transform and a first Finite Impulse Response filter can be applied to the second signal. The first signal processing instructions can based on a first physical layer protocol. The first physical layer protocol can comprise a DOCSIS protocol, MoCA protocol, QAM protocol, and/or the like. In one aspect, the first signal processing instructions can be configured to define a first frequency range. The first portion of the second signal can comprise a portion of the second signal within the first frequency range.

At step 508, a second portion of the second signal can be selected based on a second reconfigurable module. The second reconfigurable module can be configured with and/or comprise second signal processing instructions. For example, at least one of a second Fourier Transform and a second Finite Impulse Response filter can be applied to the second signal. The second signal processing instructions can be based on a second physical layer protocol. The second physical layer protocol can comprise a DOCSIS protocol, MoCA protocol, QAM protocol, and/or the like. The second protocol can comprise an updated version of the first protocol. In one aspect, the second signal processing instructions can be configured to define a second frequency range. The second portion of the second signal can comprise a portion of the second signal within the second frequency range.

At step 510, the first portion of the second signal can be processed based on the first reconfigurable module. For example, the first portion of the second signal can be processed based on the first signal processing instructions. The first reconfigurable module can be configured to instruct processing of the first portion of the second signal based on a DOCSIS protocol, a MoCA, a protocol for processing QAM based content streams, and/or the like. For example, the first portion of the second signal can be demodulated. The first portion of the second signal can be demodulated to form a first bit stream (e.g., based on the first signal processing instructions). The first bit stream can be processed (e.g., decoded) according to the first signal processing instructions. For example, the first bit stream can be packetized. Multiple access scheduling can be implemented based on the first bit stream. As an example, DOCSIS packets can be formed from the first bit stream (e.g. QAM bit stream). Internet Protocol (IP) packets can be formed from DOCSIS packets. The IP packets can be converted into Ethernet packets or sent to a VoIP module.

At step 512, the second portion of the second signal can be processed based on the second reconfigurable module. For example, the second portion of the second signal can be processed based on the second signal processing instructions. The second reconfigurable module can be configured to instruct processing of the second portion of the second signal based on a DOCSIS protocol, a MoCA protocol, a protocol for processing QAM based content streams, and/or the like. For example, the second portion of the second signal can be demodulated. The second portion of the second signal can be demodulated to form a second bit stream (e.g., based on the second signal processing instructions). The second bit stream can be processed (e.g., decoded) according to the second signal processing instructions. For example, the second bit stream can be packetized. Multiple access scheduling can be implemented based on the second bit stream. As an illustration, the second bit stream (e.g., (QAM bit stream) can be formed from the first signal. MoCA packets can be formed from the second bit stream.

At step 514, a third portion of the second signal can be selected based on a third reconfigurable module. The third reconfigurable module can be configured with and/or comprise third signal processing instructions. For example, at least one of a third Fourier Transform and a third Finite Impulse Response filter can be applied to the second signal. The third signal processing instructions can be based on a third physical layer protocol. In one aspect, the third signal processing instructions can be configured to define a third frequency range. The third portion of the second signal can comprise a portion of the second signal within the third frequency range.

At step 516, the third portion of the second signal can be processed based on the third reconfigurable module. For example, the third portion of the second signal can be processed based on the third signal processing instructions. The third signal processing instructions can comprise and/or be based on based on a DOCSIS protocol, a MoCA protocol, a protocol for processing QAM based content streams, and/or the like. For example, the third portion of the second signal can be demodulated. The third portion of the second signal can be demodulated to form a third bit stream (e.g., based on the third signal processing instructions). The third bit stream can be processed (e.g., decoded) according to the third signal processing instructions. For example, the third bit stream can be packetized. Multiple access scheduling can be implemented based on the third bit stream.

At step 518, a fourth portion of the second signal can be selected based on a fourth module. The fourth reconfigurable module can be configured with and/or comprise fourth signal processing instructions. For example, at least one of a fourth Fourier Transform and a fourth Finite Impulse Response filter can be applied to the second signal. The fourth signal processing instructions can be based on a fourth physical layer protocol. In one aspect, the fourth signal processing instructions can be configured to define a fourth frequency range. The fourth portion of the second signal can comprise a portion of the second signal within the fourth frequency range.

At step 520, the fourth portion of the second signal can be processed based on the fourth module. For example, the fourth portion of the second signal can be processed based on the fourth signal processing instructions. The fourth signal processing instructions can be based on a DOCSIS protocol, a MoCA protocol, a protocol for processing QAM based content streams, and/or the like. For example, the fourth portion of the second signal can be demodulated. The fourth portion of the second signal can be demodulated to form a fourth bit stream (e.g., based on the fourth signal processing instructions). The fourth bit stream can be processed (e.g., decoded) according to the fourth signal processing instructions. For example, the thrust bit stream can be packetized. Multiple access scheduling can be implemented based on the third bit stream.

In one aspect, the first reconfigurable module, second reconfigurable module, third reconfigurable module, and/or fourth reconfigurable module (e.g., or a processing operating based on one of these modules) can receive the second signal (e.g. or data indicative of the second signal) from another module, such as the first reconfigurable module, second reconfigurable module, third reconfigurable module, fourth reconfigurable module, and/or other module. For example, one or more of the first reconfigurable module, second reconfigurable module, third reconfigurable module, and/or fourth reconfigurable module can be configured to demodulate (e.g., or be used by a processor to demodulate) a portion (e.g., first portion, second portion, third portion, fourth portion) of the second signal to form a bit stream (e.g., first bit stream, second bit stream, third bit stream, fourth bit stream) and provide the bit stream to another receiving module (e.g., first reconfigurable module, second reconfigurable module, third reconfigurable module, fourth reconfigurable module). The receiving module can process the bit stream according to signal processing instructions. As an illustration, a module comprising instructions for a QAM based protocol, orthogonal frequency-division multiplexing (OFDM) protocol, and/or the like can demodulate a portion of the second signal to form a bit stream. The bit stream can be provided to the receiving module for further processing.

In one aspect, the first reconfigurable module, second reconfigurable module, third reconfigurable module, and/or fourth reconfigurable module can be reconfigurable based on an update. For example, the first reconfigurable module, second reconfigurable module, third reconfigurable module, and/or fourth reconfigurable module can comprise and/or be configured corresponding signal processing instructions indicating one or more procedures for performing an operation at the physical layer. The update can modify, change, add, and/or otherwise alter the signal processing instructions to reconfigure a physical layer operation of the device and/or at least one of the first reconfigurable module, second reconfigurable module, third reconfigurable module, and fourth reconfigurable module. For example, the first reconfigurable module, second reconfigurable module, third reconfigurable module, and/or fourth reconfigurable module can be configured to at least one of generate a bit stream based on packets and generate packets based on a bit stream. As further example, the device can comprise an FPGA. The FPGA can comprise one or more the first reconfigurable module, second reconfigurable module, third reconfigurable module, and/or fourth reconfigurable module. The device can be configured to modify, based on the update, the arrangement of one or more gates (e.g., logic gates), logic blocks, flip-flops, connections, memory blocks, transistors, and/or the like associated with a corresponding reconfigurable module. Such modifications can enable the device to implement updated protocols, and/or other standards for processing at the physical layer (e.g., or other layers).

As an illustration, the first reconfigurable module can comprise a DOCSIS module. The update can update the first reconfigurable module from a first version of DOCSIS (e.g., DOCSIS version 3.0) to a second version of DOCSIS (e.g., DOCSIS version 3.1 or other version). For example, the update can be configured to modify the width of channel spacing (e.g., from wide frequency channels, such as 6 to 8 MHz, to more narrow channels, such as 20 to 50 KHz, or vice versa) that the device uses to modulate, demodulate, and/or otherwise process signals. The update can be configured to modify, add, and/or remove the device's ability to process information and signals according to various transmission schemes, such as OFDM or other modulation scheme. As another illustration, the second reconfigurable module can comprise a MoCA module. The update can modify the second reconfigurable module from a first version of MoCA (e.g., MoCA version 1.1) to a second version of MoCA (e.g., DOCSIS version 2.1 or other version).

Figure 6:
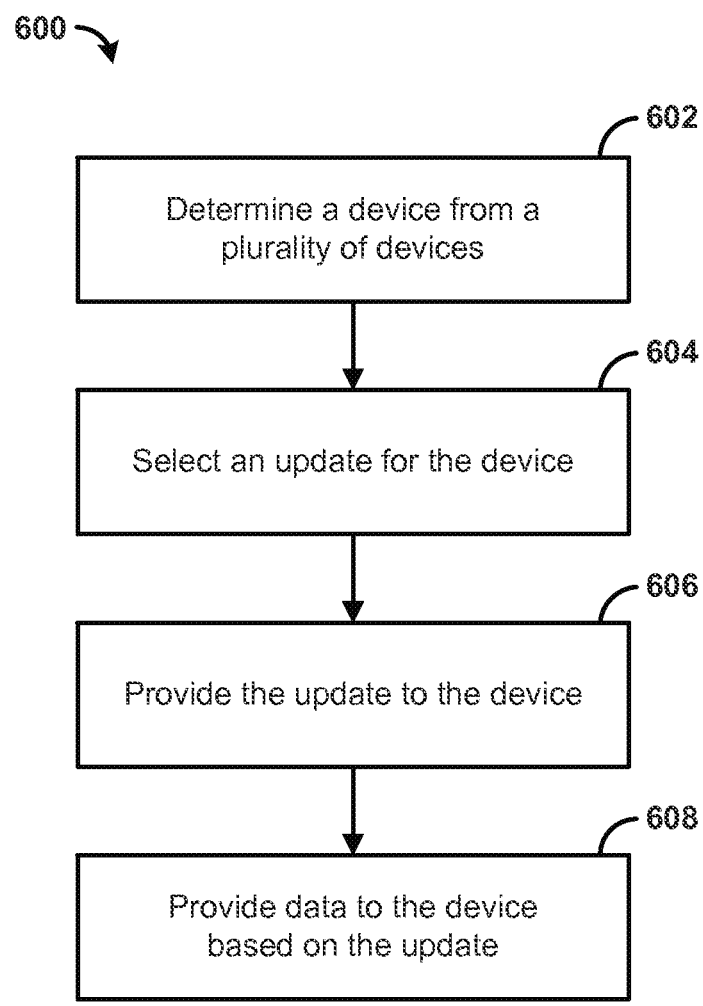
FIG. 6 is a flowchart illustrating an example method for updating a device.

FIG. 6 is a flowchart of an example method 600 for updating a device. At step 602, a device from a plurality of devices can be determined. The device can be a reconfigurable device. For example, the device can comprise a programmable chip, such as a field programmable gate array (FPGA). The device can comprise a procedure (e.g., instructions) for processing a signal at a physical layer of the signal. For example, the procedure can be a procedure for selecting a portion (e.g., within a given frequency range) of a signal. The procedure can be a procedure for selecting a portion (e.g., within a frequency ranged defined by the procedure) of a signal, demodulating a signal, decoding a signal (e.g., into a bit stream), performing a channel bonding procedure, and/or the like. The procedure can comprise a procedure for generating a bit stream based on packets (e.g., or frames) and/or generating packets (e.g., or frames) based on a bit stream.

At step 604, an update for the device can be selected. The update can be configured to modify the procedure. For example, a type of the device can be determined. The update can be selected based on the type of the device. For example, if the type of the device indicates that a physical layer protocol can be updated, then the update can be an update to a physical layer protocol. The update can modify a procedure for selecting a portion (e.g., within a frequency ranged defined by the procedure) of a signal, demodulating a signal, decoding a signal (e.g., into a bit stream), performing a channel bonding procedure, and/or the like. In one aspect, the update can comprise updated, modified, and/or additional instructions, procedures, protocols, and/or the like.

At step 606, the update can be provided to the device. For example, the update can be provided to the device through a network, signal, and/or the like. The update can be provided through a file transfer protocol, trivial file transfer protocol, and/or the like. The update can be provided as a software update, firmware update, and/or the like.

At step 608, data can be provided to the device based on the update. For example, data can be provided to the device based on an updated, modified, and/or added procedure, instructions, and/or the like. For example, the data can be provided based on an updated procedure for selecting a portion (e.g., within a frequency ranged defined by the procedure) of a signal, demodulating a signal, decoding a signal (e.g., into a bit stream), performing a channel bonding procedure, and/or the like.

Figure 7:
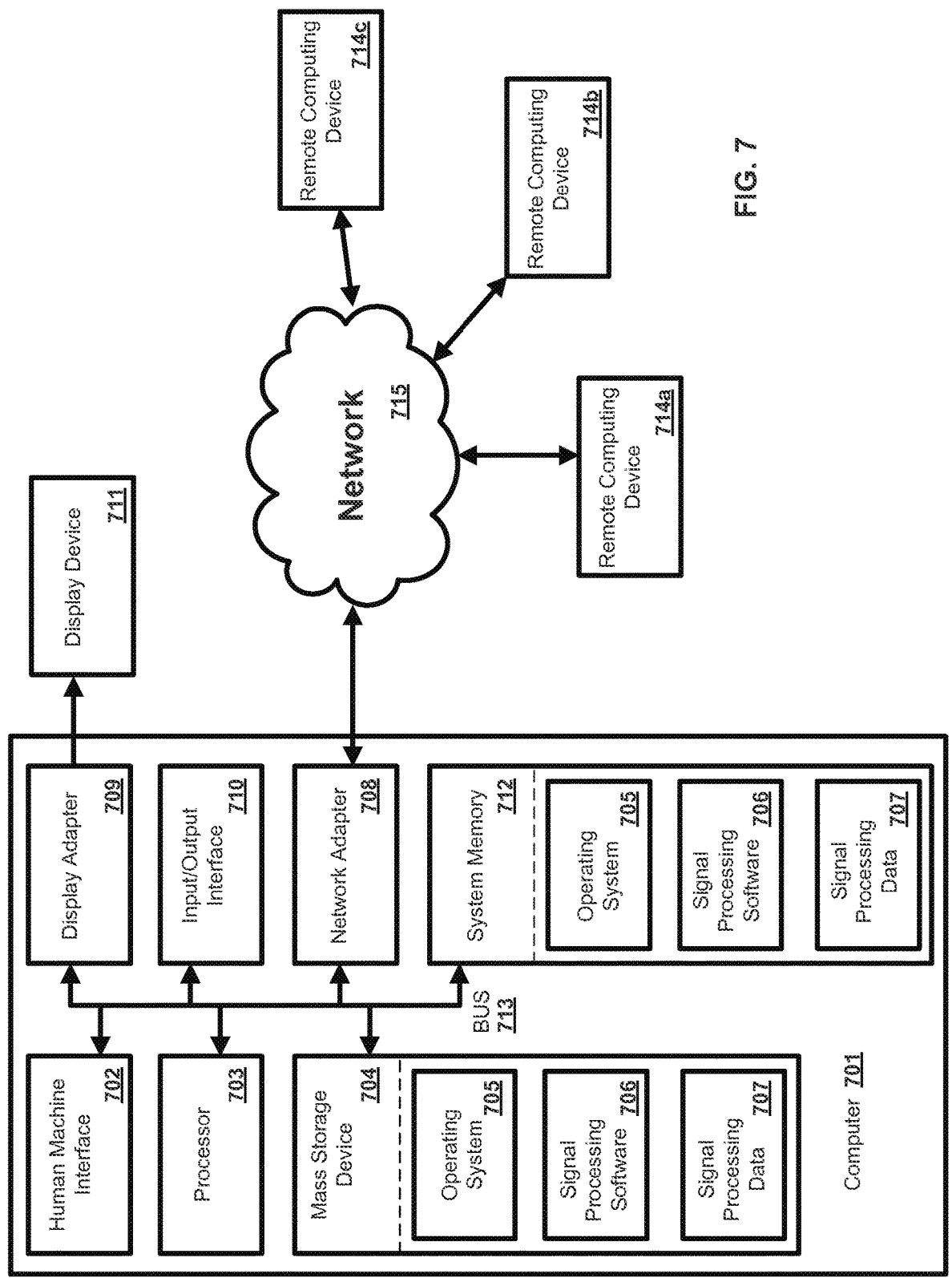
FIG. 7 is a block diagram illustrating an example computing system in which the present methods and systems can operate.

In an exemplary aspect, the methods and systems can be implemented on a computer 701 as illustrated in FIG. 7 and described below. By way of example, the first device 102, second device 106, and/or third device 108 of FIG. 1 can be a computer as illustrated in FIG. 7. As another example, the second device 204 of FIG. 2 can be a computer as illustrated in FIG. 7. Similarly, the methods and systems disclosed can utilize one or more computers to perform one or more functions in one or more locations. FIG. 7 is a block diagram illustrating an exemplary operating environment for performing the disclosed methods. This exemplary operating environment is only an example of an operating environment and is not intended to suggest any limitation as to the scope of use or functionality of operating environment architecture. Neither should the operating environment be interpreted as having any dependency or requirement relating to any one or combination of components illustrated in the exemplary operating environment.

The present methods and systems can be operational with numerous other general purpose or special purpose computing system environments or configurations. Examples of well known computing systems, environments, and/or configurations that can be suitable for use with the systems and methods comprise, but are not limited to, personal computers, server computers, laptop devices, and multiprocessor systems. Additional examples comprise set top boxes, programmable consumer electronics, network PCs, minicomputers, mainframe computers, distributed computing environments that comprise any of the above systems or devices, and the like.

The processing of the disclosed methods and systems can be performed by software components. The disclosed systems and methods can be described in the general context of computer-executable instructions, such as program modules, being executed by one or more computers or other devices. Generally, program modules comprise computer code, routines, programs, objects, components, data structures, etc. that perform particular tasks or implement particular abstract data types. The disclosed methods can also be practiced in grid-based and distributed computing environments where tasks are performed by remote processing devices that are linked through a communications network. In a distributed computing environment, program modules can be located in both local and remote computer storage media including memory storage devices.

Further, one skilled in the art will appreciate that the systems and methods disclosed herein can be implemented via a general-purpose computing device in the form of a computer 701. The components of the computer 701 can comprise, but are not limited to, one or more processors 703, a system memory 712, and a system bus 713 that couples various system components including the one or more processors 703 to the system memory 712. In one aspect, the system can utilize parallel computing.

The system bus 713 represents one or more of several possible types of bus structures, including a memory bus or memory controller, a peripheral bus, an accelerated graphics port, and a processor or local bus using any of a variety of bus architectures. By way of example, such architectures can comprise an Industry Standard Architecture (ISA) bus, a Micro Channel Architecture (MCA) bus, an Enhanced ISA (EISA) bus, a Video Electronics Standards Association (VESA) local bus, an Accelerated Graphics Port (AGP) bus, and a Peripheral Component Interconnects (PCI), a PCI-Express bus, a Personal Computer Memory Card Industry Association (PCMCIA), Universal Serial Bus (USB) and the like. The system bus 713, and all buses specified in this description can also be implemented over a wired or wireless network connection and each of the subsystems, including the one or more processors 703, a mass storage device 704, an operating system 705, signal processing software 706, signal processing data 707, a network adapter 708, system memory 712, an Input/Output Interface 710, a display adapter 709, a display device 711, and a human machine interface 702, can be contained within one or more remote computing devices 714a,b,c at physically separate locations, connected through buses of this form, in effect implementing a fully distributed system.

The computer 701 typically comprises a variety of computer readable media. Exemplary readable media can be any available media that is accessible by the computer 701 and comprises, for example and not meant to be limiting, both volatile and non-volatile media, removable and non-removable media. The system memory 712 comprises computer readable media in the form of volatile memory, such as random access memory (RAM), and/or non-volatile memory, such as read only memory (ROM). The system memory 712 typically contains data such as signal processing data 707 and/or program modules such as operating system 705 (e.g., or a portion thereof) and signal processing software 706 that are immediately accessible to and/or are presently operated on by the one or more processors 703.

In another aspect, the computer 701 can also comprise other removable/non-removable, volatile/non-volatile computer storage media. The mass storage device 704 can provide non-volatile storage of computer code, computer readable instructions, data structures, program modules, and other data for the computer 701. For example and not meant to be limiting, a mass storage device 704 can be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like.

Optionally, any number of program modules can be stored on the mass storage device 704, including by way of example, an operating system 705 (e.g., or a portion thereof) and signal processing software 706. One or more the operating system 705 and signal processing software 706 (or some combination thereof) can comprise elements of the programming and the signal processing software 706. Signal processing data 707 can also be stored on the mass storage device 704. Signal processing data 707 can be stored in any of one or more databases known in the art. Examples of such databases comprise, DB2®, Microsoft® Access, Microsoft® SQL Server, Oracle®, mySQL, PostgreSQL, and the like. The databases can be centralized or distributed across multiple systems.

In another aspect, the user can enter commands and information into the computer 701 via an input device (not shown). Examples of such input devices comprise, but are not limited to, a keyboard, pointing device (e.g., a "mouse"), a microphone, a joystick, a scanner, tactile input devices such as gloves, and other body coverings, and the like. These and other input devices can be connected to the one or more processors 703 via a human machine interface 702 that is coupled to the system bus 713, but can be connected by other interface and bus structures, such as a parallel port, game port, an IEEE 1394 Port (also known as a Firewire port), a serial port, or a universal serial bus (USB).

In yet another aspect, a display device 711 can also be connected to the system bus 713 via an interface, such as a display adapter 709. It is contemplated that the computer 701 can have more than one display adapter 709 and the computer 701 can have more than one display device 711. For example, a display device 711 can be a monitor, an LCD (Liquid Crystal Display), or a projector. In addition to the display device 711, other output peripheral devices can comprise components such as speakers (not shown) and a printer (not shown) which can be connected to the computer 701 via Input/Output Interface 710. Any step and/or result of the methods can be output in any form to an output device. Such output can be any form of visual representation, including, but not limited to, textual, graphical, animation, audio, tactile, and the like. The display device 711 and computer 701 can be part of one device, or separate devices.

The computer 701 can operate in a networked environment using logical connections to one or more remote computing devices 714*a,b,c*. By way of example, a remote computing device can be a personal computer, portable computer, smartphone, a server, a router, a network computer, a peer device or other common network node, and so on. Logical connections between the computer 701 and a remote computing device 714*a,b,c* can be made via a network 715, such as a local area network (LAN) and/or a general wide area network (WAN). Such network connections can be through a network adapter 708. A network adapter 708 can be implemented in both wired and wireless environments. Such networking environments are conventional and commonplace in dwellings, offices, enterprise-wide computer networks, intranets, and the Internet.

For purposes of illustration, application programs and other executable program components such as the operating system 705 are illustrated herein as discrete blocks, although it is recognized that such programs and components reside at various times in different storage components of the computer 701, and are executed by the data processor(s) of the computer. An implementation of signal processing software 706 can be stored on or transmitted across some form of computer readable media. Any of the disclosed methods can be performed by computer readable instructions embodied on computer readable media. Computer readable media can be any available media that can be accessed by a computer. By way of example and not meant to be limiting, computer readable media can comprise "computer storage media" and "communications media." "Computer storage media" comprise volatile and non-volatile, removable and non-removable media implemented in any methods or technology for storage of information such as computer readable instructions, data structures, program modules, or other data. Exemplary computer storage media comprises, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

The methods and systems can employ Artificial Intelligence techniques such as machine learning and iterative learning. Examples of such techniques include, but are not limited to, expert systems, case based reasoning, Bayesian networks, behavior based AI, neural networks, fuzzy systems, evolutionary computation (e.g. genetic algorithms), swarm intelligence (e.g. ant algorithms), and hybrid intelligent systems (e.g. Expert inference rules generated through a neural network or production rules from statistical learning).

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

It will be apparent to those skilled in the art that various modifications and variations can be made without departing from the scope or spirit. Other embodiments will be apparent to those skilled in the art from consideration of the specification and practice disclosed herein. It is intended that the specification and examples be considered as exemplary only, with a true scope and spirit being indicated by the following claims.

What is claimed is:

1. A method, comprising:
   receiving, by a first computing device from a second computing device, a signal, wherein the second computing device sends the signal to the first computing device based on a device type of the first computing device indicating that a physical layer protocol of the first computing device is capable of being updated;
   processing, based on a software module of the first computing device, a first portion of the signal, wherein the software module is configured for physical layer processing according to a first version of the physical layer protocol based on first machine-executable instructions;
   receiving, from the second computing device, an update for the software module, wherein the update comprises second machine-executable instructions for implementing physical layer processing according to a second version of the physical layer protocol;
   updating, based on the received update, the software module; and
   processing, based on the updated software module, a second portion of the signal, wherein the updated software module is configured for physical layer processing according to the second version of the physical layer protocol based on the second machine-executable instructions.

2. The method of claim 1, wherein the update is configured to modify a spectrum range upon which the first computing device operates.

3. The method of claim 1, wherein the physical layer protocol comprises at least one of a Data Over Cable Service Interface Specification (DOCSIS) protocol, a multimedia over coax alliance (MoCA) protocol, or a protocol for processing quadrature amplitude modulation (QAM) based content streams.

4. The method of claim 1, wherein the update is configured to modify a radio frequency bonding procedure of the software module.

5. The method of claim 1, wherein receiving the update for the software module comprises receiving the update via the signal.

6. The method of claim 1, wherein the update is configured to modify a procedure for generating, based on a first digital stream, a plurality of packets and a procedure for generating, based on the plurality of packets, a second digital stream.

7. The method of claim 1, wherein the first version of the physical layer protocol comprises a Data Over Cable Service Interface Specification (DOCSIS) protocol.

8. A method, comprising:
receiving, by a first computing device from a second computing device, a first signal, wherein the second computing device sends the first signal to the first computing device based on a device type of the first computing device indicating that a first physical layer protocol of the first computing device is capable of being updated;
selecting, based on a first software module of the first computing device, a first portion of a second signal, wherein the first software module is configured for physical layer processing according to the first physical layer protocol based on first signal processing instructions, wherein the first signal processing instructions are updatable based on an update from the second computing device and based on the device type of the first computing device, wherein the update comprises third signal processing instructions for implementing physical layer processing according to a newer version of the first physical layer protocol;
selecting, based on a second software module of the first computing device, a second portion of the second signal, wherein the second software module is configured for physical layer processing according to a second physical layer protocol based on second signal processing instructions;
processing, based on the first software module, the first portion of the second signal according to the newer version of the first physical layer protocol; and
processing, based on the second software module, the second portion of the second signal according to the second physical layer protocol.

9. The method of claim 8, wherein the first physical layer protocol comprises a Data Over Cable Service Interface Specification (DOCSIS) protocol, and wherein the second physical layer protocol comprises a Multimedia Over Coax Alliance (MoCA) protocol.

10. The method of claim 8, further comprising:
selecting, based on a third software module of the first computing device, a third portion of the second signal, wherein the third software module is configured with the third signal processing instructions; and
processing, based on the third software module, the third portion of the second signal, wherein the third signal processing instructions are based on a protocol for processing quadrature amplitude modulation (QAM) based content streams.

11. The method of claim 8, wherein at least one of the first physical layer protocol or the second physical layer protocol comprises at least one of a Data Over Cable Service Interface Specification (DOCSIS) protocol, a multimedia over coax alliance (MoCA) protocol, or a protocol for processing quadrature amplitude modulation (QAM) based content streams.

12. The method of claim 8, wherein selecting, based on the first software module, the first portion of the second signal comprises applying at least one of a first Fourier Transform or a first Finite Impulse Response filter to the second signal.

13. The method of claim 8, wherein the second signal processing instructions are updatable based on an additional update.

14. The method of claim 8, wherein processing, based on the first software module, the first portion of the second signal comprises:
generating, based on a plurality of packets, a bit stream, or
generating, based on the bit stream, the plurality of packets.

15. A first computing device, comprising:
one or more processors; and
memory storing processor-executable instructions that, when executed by the one or more processors, cause the first computing device to:
receive, by the first computing device from a second computing device, a signal, wherein the second computing device sends the signal to the first computing device based on a device type of the first computing device indicating that a first physical layer protocol of the first computing device is capable of being updated;
process, based on a first software module of the first computing device, a first portion of the signal, wherein the first software module comprises first processor-executable instructions for processing, based on the first physical layer protocol, the first portion of the signal;
process, based on a second software module of the first computing device, a second portion of the signal, wherein the second software module comprises second processor-executable instructions for processing, based on a second physical layer protocol, the second portion of the signal; and
wherein at least one of the first software module or the second software module is reconfigurable, based on an update received from the second computing device and based on the device type of the first computing device that updates at least one of the first processor-executable instructions or the second processor-executable instructions with third processor-executable instructions, for controlling signal processing at a physical layer of the signal.

16. The first computing device of claim 15, wherein the first physical layer protocol comprises a Data Over Cable Service Interface Specification (DOCSIS) protocol, and wherein the second physical layer protocol comprises at least one of a Multimedia Over Coax Alliance (MoCA) protocol or a protocol for processing quadrature amplitude modulation (QAM) based content streams.

17. The first computing device of claim 15, wherein the processor-executable instructions, when executed by the one or more processors, cause the first computing device to receive the update via the signal.

18. The first computing device of claim 15, wherein the first processor-executable instructions for processing, based on the first physical layer protocol, the first portion of the signal comprise third processor-executable instructions that cause the first computing device to at least one of access or manipulate the physical layer of the signal.

19. The first computing device of claim 15, wherein the first processor-executable instructions for processing, based on the first physical layer protocol, the first portion of the signal comprise third processor-executable instructions that cause the first computing device to select, based on a range of frequencies of a plurality of ranges of frequencies, the first portion of the signal, and wherein the first processor-executable instructions are reconfigurable to select, based on another range of frequencies of the plurality of ranges of frequencies, a third portion of the signal.

20. The first computing device of claim 15, wherein the update is configured to modify a procedure for generating, based on a first digital stream, a plurality of packets and a procedure for generating, based on the plurality of packets, a second digital stream.

* * * * *